June 26, 1934.  J. P. SPANG  1,964,089
MEAT CUBING MACHINE
Filed Jan. 7, 1931  3 Sheets-Sheet 1

Inventor:
Joseph P. Spang.
by Heard Smith & Tennant.
Attys.

June 26, 1934.                    J. P. SPANG                    1,964,089
                              MEAT CUBING MACHINE
                    Filed Jan. 7, 1931         3 Sheets-Sheet 2
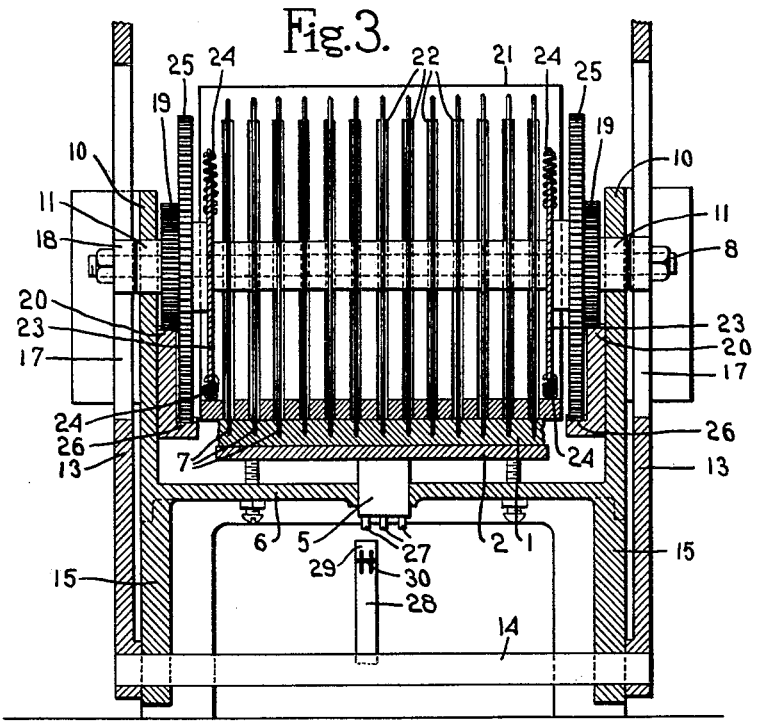
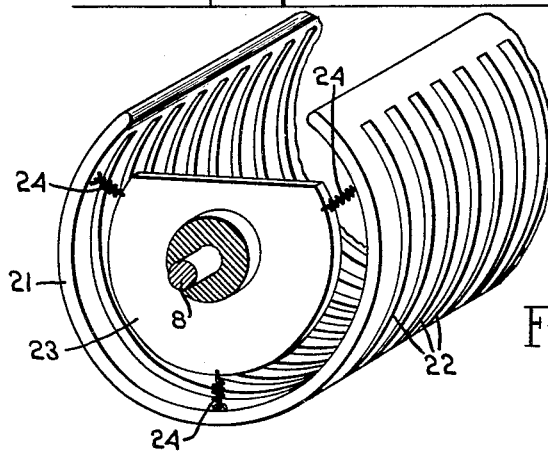
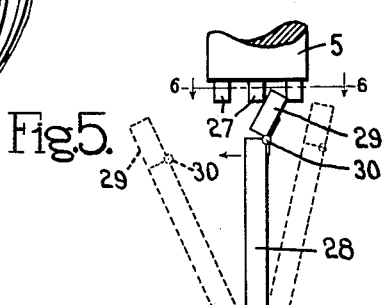
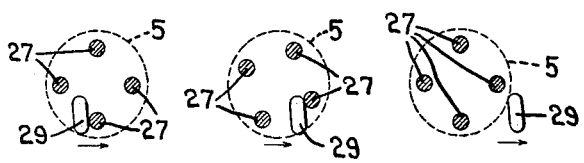
Inventor.
Joseph P. Spang
by Heard Smith & Tennant
Attys.

June 26, 1934.  J. P. SPANG  1,964,089
MEAT CUBING MACHINE
Filed Jan. 7, 1931   3 Sheets-Sheet 3
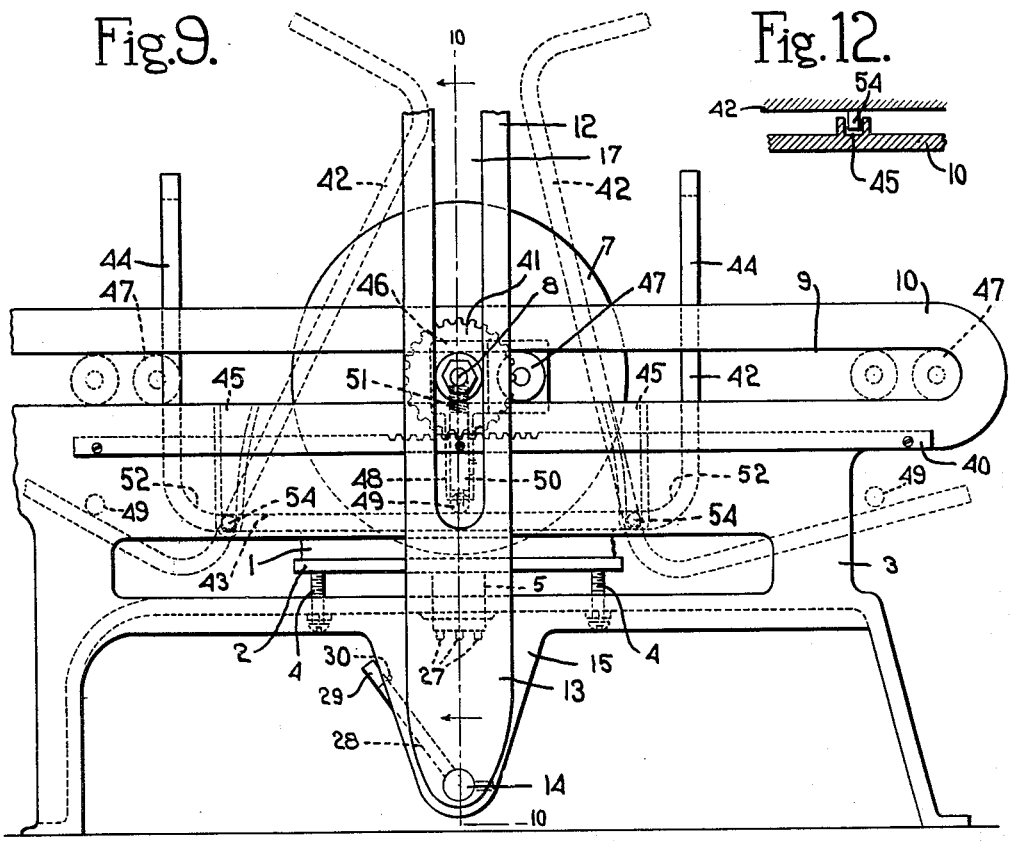
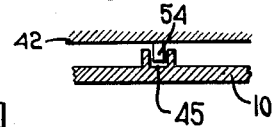
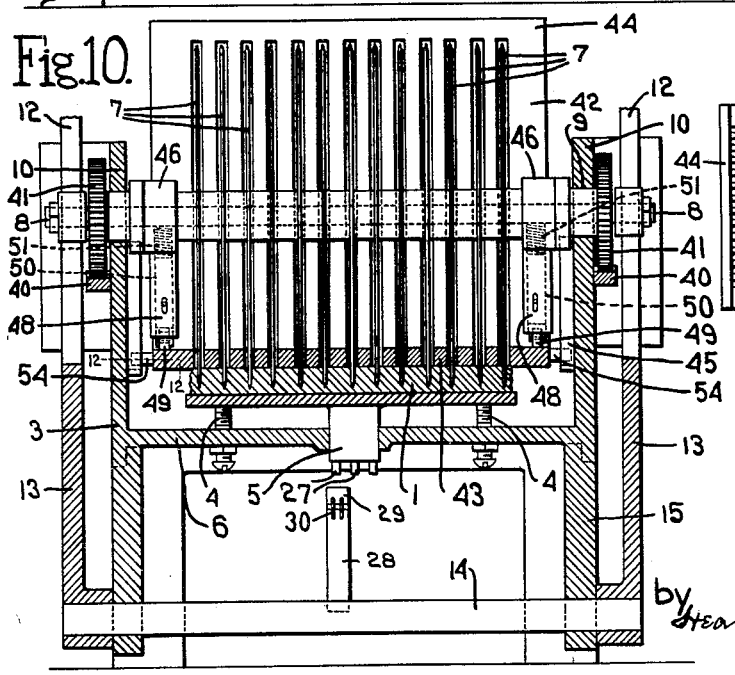
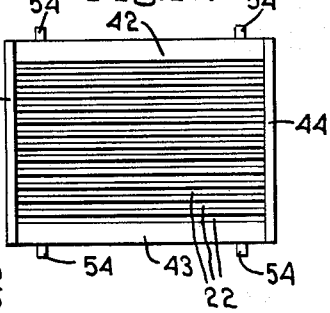
Inventor:
Joseph P. Spang
by Heard, Smith & Tennant
Attys.

Patented June 26, 1934

1,964,089

UNITED STATES PATENT OFFICE 1,964,089

MEAT-CUBING MACHINE

Joseph P. Spang, Quincy, Mass.

Application January 7, 1931, Serial No. 507,208

15 Claims. (Cl. 17—27)

This invention relates to meat-cubing machines of the type which comprise a gang of rotary knives and means to move the knives across the slice of meat to be cubed and at the same time to rotate the knives thereby to cut the slits in the meat.

One of the objects of the present invention is to provide an improved form of hold-down and stripper which functions to hold the meat on the table during the cubing operation and also to strip the meat from the knives. My improved hold-down and stripper is a rocking member which is so constructed that during each stroke the hold-down and stripper member has a rocking movement to free it from the meat being operated on thereby leaving the meat free to be removed from the machine or to be turned into position to have another series of slits formed therein.

Another object of the invention is to provide a novel means for automatically turning the turntable at the end of the forward stroke so that upon the return stroke the knives will cut slits in the meat at an angle to the slits which were cut during the forward stroke. With my invention, therefore, the cubing of the meat is accomplished by simply giving the knives a forward and backward pass across the meat, the slice of meat being automatically turned at the end of the forward pass and before the knives begin the backward movement.

In order to give an understanding of the invention I have illustrated in the drawings some selected embodiments thereof which will now be described after which the novel features will be pointed out in the appended claims.

Fig. 3 is a section on the line 3—3, Fig. 2;

Fig. 4 is a fragmentary perspective view of the hold-down and stripper member;

Fig. 5 is a fragmentary sectional view illustrating the operation of the means for turning the meat-supporting table;

Figs. 6, 7 and 8 are diagrammatic views representing sections on the line 6—6, Fig. 4, and illustrating the operation of the turntable-turning device;

Fig. 9 is a side view of a different embodiment of the invention;

Fig. 10 is a section on line 10—10 Fig. 9 with the slides 46 shown in elevation;

Fig. 11 is a reduced plan view of the hold-down member;

Fig. 12 is a fragmentary sectional view on the line 12—12 Fig. 10.

Figure 1:
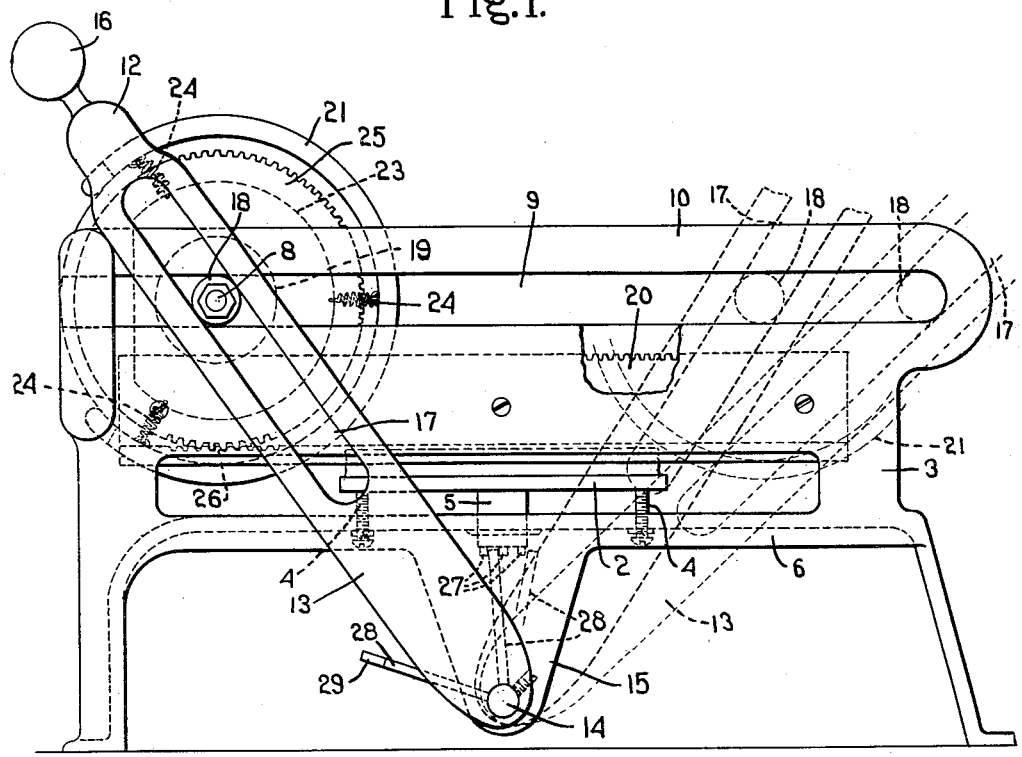
Fig. 1 is a side view of a meat-cubing machine embodying my invention.

I will first describe the form of the invention illustrated in Figs. 1 to 8.

The meat to be cubed, which is usually in the form of a slice, is indicated at 1, and this is supported on a table 2 which is capable of rotative movement. This table 2, as well as the slitting knives hereinafter referred to, are mounted on a suitable frame 3. The turntable is shown as resting on levelling screws 4 mounted in the frame 3 and as provided with a central hub 5 which extends through and finds bearing in the base portion 6 of the frame.

In this embodiment of the invention the slits are cut in the meat by means of rotary knives, such knives being indicated at 7. These knives are rigidly fixed to a knife-carrying shaft 8. The ends of the shaft extend through and are guided by slots 9 formed in the side pieces 10 of the frame 3. The portions of the shaft 8 which occupy the slot 9 are preferably provided with rolls 11 which engage the walls of the slot and which are for the purpose of reducing friction.

Means are provided for moving the shaft 8 with its knives 7 longitudinally of the slots 9 thereby carrying the knives across the meat 1, and at the same time rotating the knives to cause them to cut slits in the meat. This movement of the knives is secured through the medium of a U-shaped knife-actuating member 12, the legs 13 of which embrace the sides 10 of the frame and are fast on a rock shaft 14 which is journalled in extensions 15 formed on the frame.

The bridge portion of the U-shaped actuator is provided with a handle 16 by which it may be moved from the full to the dotted line position, Fig. 1 and vice versa.

Each leg or arm 13 of the U-shaped knife-actuating member 12 is provided with a slot 17 in which the end of the shaft 8 is received. Each end of the shaft carries a freely-rotatable roll 18 which engages the walls of the slot 17 and serves to reduce friction.

The shaft 8 has fast thereon two gears 19 which mesh with racks 20 secured to the inside of the cheeks or sides 10 of the frame. By means of this construction the knives will be positively rotated as they are moved across the meat and will thus effectively slit the meat.

In order to properly hold the meat on the table 2 during the slitting operation it is desirable to employ a hold-down element which may also be in the nature of a stripping element and one feature of the present invention relates to the construction of such hold-down element. In this invention the hold-down element is a rocking element which has a rocking engagement with the meat, the construction being such that during each stroke of the knives the hold-down member is rocked into an inoperative position in which it is free from the meat.

In Figs. 1 to 4 I have shown an embodiment of the invention where this rocking hold-down member rolls across the meat as the knives are moved from one end of the stroke to the other and during the rolling action of said hold-down member on the meat said hold-down member is at all times in engagement with the portion of the meat 1 on which the knives are acting. The construction is such that at each end of the stroke of the knives the hold-down will have rolled off from the meat so that the latter is free to be removed from the table 1 or the table is free to be turned without the necessity of lifting or manipulating the hold-down member.

This combined hold-down and stripper member is indicated generally at 21 and it is in the form of a parti-cylindrical element of larger diameter than the knives and which is provided with peripheral or circumferential slots 22 in which the knives 7 operate. This hold-down member is connected to the gang of knives so that it will be carried across the meat with the knives during the cutting operation of the latter but the connection is a resilient one so that the hold-down member can have the proper movement relative to the knives to allow the hold-down member to roll across the surface of the meat while the knives are cutting slits in the meat.

This hold-down member, which has a sort of cradle formation, as best seen in Fig. 4, is yieldingly connected at each end to a disk-like member 23 which is loosely mounted on the shaft 8. Any suitable yielding connection between the member 21 and the disks 23 may be employed. As herein shown such yielding connection is in the form of coil springs 24 which normally hold the stripper member 21 centered with respect to the shaft 8 as shown in Fig. 4 but which allow said member to move bodily in a direction transversely to said shaft.

Means are also provided for giving the hold-down member a positive rotation as the knives are carried across the meat. This means is constructed to rotate the hold-down and stripper 21 at such a speed that it will have a rolling engagement with the meat without any slippage occurring between said member and the surface of the meat.

For this purpose the disks 24 have rigid therewith two large gears 25 which, of course, are loosely mounted on the shaft 8 as are the disks 24. These gears 25 mesh with racks 26 carried by the sides 10 of the frame 3 and the racks are located in substantially the horizontal plane of the top surface of the meat 1. Because of this construction the gears 25 and the disk 24 will have a slower rotative speed than the knives, and the hold-down and stripper member 21 will have the same slower rotative movement, which, because of the location of the racks 26 with reference to the top surface of the meat 1, will cause the hold-down member to roll across the meat without causing any slippage between the hold-down member and meat.

The full lines in Fig. 1 illustrate the knives and the hold-down member at the rear limit of their movement and when in this position both the knives and the hold-down member are free from the table 2 so that the latter is freely exposed to permit a piece of meat 1 to be placed thereon or to be removed therefrom.

As the knife-operating member 12 is swung from the full to the left hand dotted line position Fig. 1 the knives will be carried across the meat and will be positively rotated rapidly during such movement thereby to cut the slits in the meat. During this same movement the hold-down and stripper member 21 will also roll across the meat.

Figure 2:
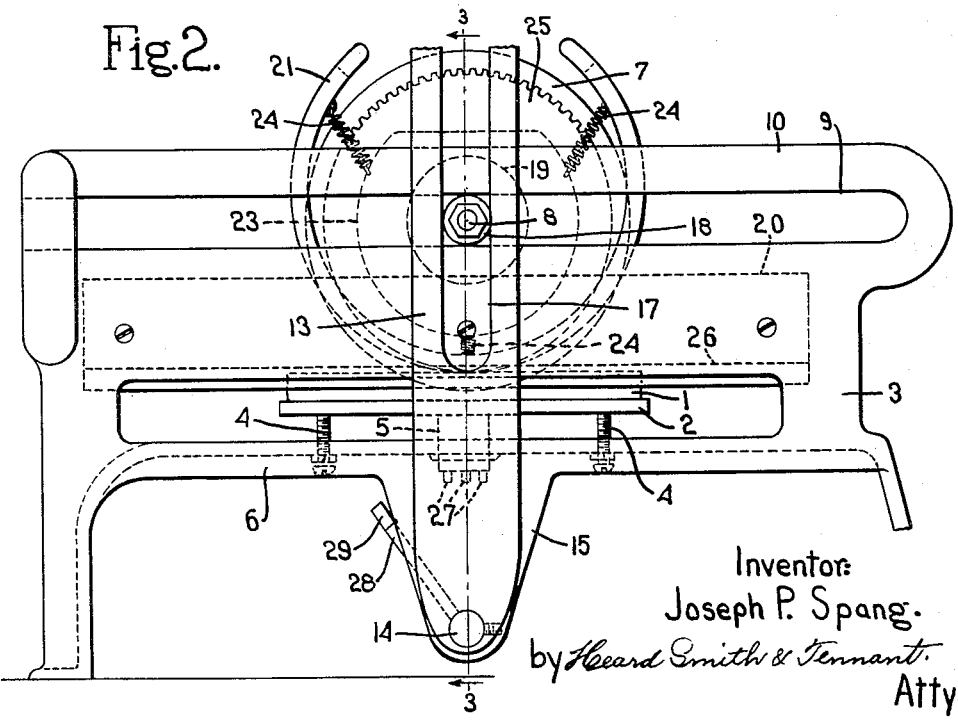
Fig. 2 is a similar view showing the position of the parts during the slitting or cubing of the meat.

In the position shown in full lines Fig. 1 the hold-down member will be held centered with relation to the shaft 8 but as soon as the hold-down member strikes the meat it will roll along the top of the meat and will be shifted into a position eccentric to the shaft 8 as shown in Fig. 2, the springs 24 allowing this movement. Due to this shifting movement the lower edges of the knives 7 are projected through the slots 22 in the hold-down member so that during the passage across the meat the cutting portion of the knives is working through the slots 22 and below the hold-down member and the latter will be held yieldingly against the meat by the springs 24 but will have rolling contact with the meat. When the knife-actuating member 16 has been carried to the limit of its forward movement both the gang of knives and the hold-down member will have been carried off from and out of contact with the meat.

In Figs. 9 to 12 I have shown a different embodiment of the invention wherein the hold-down member remains stationary while the knives are cutting the slits in the meat but has a rocking motion to carry it off from the meat at each end of the stroke of the knives. In this embodiment of the invention the knives 7 and the means for operating them comprising the swinging knife-actuating member 12, are substantially the same as shown and described with reference to Figs. 1 to 4. The racks and gears for rotating the knives, however, are situated outside of the side pieces 10 of the frame. These racks are shown at 40 and the gears with which the racks engage and which are rigid with the shaft 8 are indicated at 41. These gears and racks are situated between the legs 13 of the knife-actuating member 12 and the frame.

The combined hold-down and stripper member is indicated at 42. This member has a sort of cradle shape but the central portion 43 thereof is straight and the ends 44 are curved upwardly. At each end of this hold-down member 42 there are two trunnions or projections 54 which normally occupy grooves 45 formed on the inner walls of the side pieces 10 of the frame.

During the passage of the knives across the meat the hold-down member occupies the full line position in Fig. 9 but when the knives are at the extreme left hand end of their stroke as indicated by the left hand dotted line position of the knife-actuating member 12 the hold-down and stripper member will be rocked into the left hand dotted line position about the left hand pair of trunnions 54 and in its dotted line position the hold-down member will be elevated from the table so that the meat 1 can be readily removed therefrom or a fresh piece of meat placed thereon.

The construction is also such that when the knife-actuating member is at the extreme right hand end of its movement as indicated by the right hand dotted line position the hold-down and stripper member will be rocked about the right hand trunnions 54 into the right hand dotted line position thereby separating it from the meat so that turntable 2 can be readily turned.

This rocking of the hold-down and stripper member 42 is accomplished through means actuated by the knife-actuating member 12. This means comprises two slides 46 which are guided by the slots 9 in the frame and which are situated inside of the cheek pieces 10 of the frame. Each slide has an opening therethrough through which the shaft 8 extends and each slide is also provided with a projection 47 which enters and is guided by the corresponding slot 9. Each slide is provided with a depending portion 48 which carries at its lower end a spring-pressed roll 49 that engages the edge of the hold-down and stripper member. The rolls 49 are shown as carried by stems 50 that are received in recesses formed in said depending portion 48 and are backed by springs 51 so that the rolls have a yielding engagement with the stripper member.

During the operation of cutting or slitting the meat the rolls engage the straight central portion of the hold-down member at the point where the knives are acting on the meat and thus the hold-down member is yieldingly held against the meat as it is being slit. As the knife-actuating member approaches either end of its movement the rolls 49 engage the curved portion 52 of the hold-down member and during the final movement of the knife-actuating member 12 such engagement rocks the hold-down member about the corresponding trunnions into one of the dotted line positions shown in Fig. 9 thereby separating said member from the meat.

As stated above this separation of the hold-down and stripper member from the meat when the knife-actuating member is at the left hand end of its stroke takes said hold-down member sufficiently away from the slice 1 of meat so that the latter can be readily removed from the table and a fresh uncut piece of meat placed thereon.

The rocking movement of the hold-down member which occurs after the knives have made a forward pass across the meat and are at the right hand end of their stroke separates the hold-down member from the meat sufficiently so that the turntable may be turned with the result that when the knives make their second or backward pass across the meat the second series of slits will be cut in the meat which are at right angles to those made during the forward pass of the knives.

Another feature of the invention relates to means for automatically turning the turntable with the meat thereon during the final portion of the forward stroke of the knife-actuating member 12 and just after the knives and the hold-down member have cleared the piece of meat so that upon the return stroke of the knife-actuating member 12 the knives will cut slits in the meat which are arranged at an angle to the slits cut by the forward strokes of the knives.

Various devices for thus turning the turntable may be employed. As herein shown the hub 5 of the turntable is provided on its lower end with four fingers 27 and the rock shaft 14 is provided with an arm 28 which engages one of these fingers during the final forward movement of the knife-actuating member 12 thereby turning the turntable through a quarter revolution. The finger 28 is shown as provided at its tip end with a section 29 which is hinged to the main portion of the finger 28 as shown at 30.

The normal position of the tip 29 is in line with the finger or arm 28 and the hinge connection 30, which is of the knuckle joint variety, will permit the tip 29 to swing in one direction from its normal position but not in the other direction.

During the swinging movement of the knife-actuating member 12 from the full line position to the left hand dotted line position Fig. 1 the arm 28 will be carried from its full line position up to the left hand dotted line position and in this position the tip 29 will be brought into engagement with one of the fingers 27 as shown in Fig. 6. At this time in the movement of the knife-actuating member 12 the knives and the combined hold-down and stripper member have been carried off from the meat as shown by dotted lines Fig. 1. During the further and final forward movement of the knife-actuating member 12 into the right hand dotted line position Fig. 1 the tip 29 of the arm 28 acts on one of the pins 27 and thereby turns the turntable 2 through a quarter revolution as indicated in the diagrams 6, 7 and 8.

When the knife-actuating member 12 is given its backward stroke to again bring it into the full line position Fig. 1 the knives will cut slits in the meat at right angles to the slits previously cut and during this movement the tip 29 of the finger 28 will engage one of the pins 27 but will yield backwardly and thereby wipe past the finger 27 without turning the hold-down or turntable 2.

With this construction, therefore, the table with the meat thereon is automatically turned at the end of the forward pass of the knives so that the operation of cubing the meat involves simply placing the meat on the turntable and then making a forward and a backward pass or movement with the knife-actuating member 12.

I claim.

1. In a meat-cubing machine, the combination with a meat-supporting table, of a gang of knives, means to move the knives across the table to slit meat thereon, a rocking hold-down and stripper member to engage the meat during the operation of the knives thereon, and means to rock said hold-down and stripper member into an inoperative position out of engagement with the meat.

2. In a meat-cubing machine, the combination with a meat-supporting table, of a gang of knives, means to move the knives across the table to slit meat thereon, a rocking hold-down and stripper member to engage the meat during the operation of the knives thereon, and means to rock said hold-down and stripper member into an inoperative position out of engagement with the meat at the end of each meat-slitting movement of the knives.

3. In a meat-cubing machine, the combination with a meat-supporting table, of a gang of knives, means to move the knives across the table to slit meat thereon, a rocking hold-down and stripper member to engage the meat, said member being stationary during the meat-slitting operation, and means to rock said member out of engagement with the meat at the end of the meat-slitting stroke of the knives.

4. In a meat-cubing machine, the combination with a meat-supporting table, of a gang of knives, knife-actuating mechanism to move the knives across the table to cut slits in the meat supported thereon, a combined hold-down and stripper member for holding the meat in position during the slitting operation, and means actuated by the knife-actuating member during its final forward stroke to rock the hold-down member off from and out of engagement with the meat.

5. In a meat-cubing machine, the combination with a meat-supporting turntable, of a gang of knives, knife-actuating mechanism to move the knives across the table to cut slits in the meat supported thereon, a combined hold-down and stripper member for holding the meat in position during the slitting operation, means actuated by the knife-actuating member during its final forward stroke to rock the hold-down member off from and out of engagement with the meat, and means for simultaneously turning the turntable.

6. In a meat-cubing machine, the combination with a meat-supporting turntable, of a gang of knives, knife-actuating mechanism to move the knives across the turntable to cut slits in the meat supported thereon, a combined hold-down and stripper member for holding the meat in position during the slitting operation, means actuated by the knife-actuating member during its final forward stroke to rock the hold-down member off from and out of engagement with the meat, and other means actuated by the knife-actuating member to turn the turntable.

7. In a meat-cubing machine, the combination with a meat-supporting turntable, of a gang of rotary knives, knife-actuating mechanism to cause said knives to pass across the turntable thereby to slit meat thereon, a combined hold-down and stripper member having a convexly-curved meat-engaging surface, means to cause said combined hold-down and stripper member to roll across the meat as the slits are cut therein and to maintain said hold-down member in a position relative to the knives in which said member has a rolling engagement with the portion of the meat being acted on by the knives, and means actuated by the knife-actuating member to turn the turntable.

8. In a meat-cubing machine, the combination with a meat-supporting turntable, of a gang of rotary slitting knives, knife-actuating mechanism to cause said knives to pass back and forth across said turntable, a combined hold-down and stripper member adapted to have rolling contact with the meat, means to roll said combined hold-down and stripper member over the surface of the meat as the slits are cut therein and to maintain said hold-down member in a position relative to the knives in which said member has a rolling engagement with the portion of the meat being acted on by the knives, and means operated by the knife-actuating member during the final portion of its forward stroke to turn the turntable.

9. In a meat-slitting machine, the combination with a table supporting meat to be slit, of a gang of circular knives for cutting slits in the meat, means to move the knives across the table thereby to cut said slits, a hold-down member traveling with the knives and having a convexly-curved meat-engaging surface, the convex curvature of which is on a radius greater than that of the knives, and means to yieldingly hold said meat-engaging surface against the meat and turn the hold-down member about its axis during its traveling movement whereby it has a rolling contact with the meat.

10. In a meat-slitting machine, the combination with a table for supporting the meat to be slit, of a gang of circular knives for cutting slits in the meat, means to move said knives across the table thereby to cut said slits, a hold-down member traveling with the knives and having a convexly-curved meat-engaging surface, a spring connection between the hold-down member and said gang of knives which holds said member yieldingly against the meat and causes it to rotate about its axis as it travels with the knives, whereby said convexly-curved surface has a rolling engagement with the meat.

11. In a meat-cubing machine, the combination with a meat-supporting table, of a gang of knives, means to move the knives across the table to slit meat thereon, a hold-down and stripper member engaging the meat during the slitting operation, said member being in the form of a curved plate having slots to receive the knives, the portions of said plate between the slots being rigidly connected, and means to roll said hold-down and stripper member over the surface of the meat as the latter is slit.

12. In a machine for slitting meat, the combination with a meat-supporting table, of a gang of knives, knife-actuating mechanism to produce a relative forward and backward movement between the table and the knives, whereby the knives operate to slit the meat on the table, a hold-down member to engage the meat during the operation of the knives thereon, and means associated with the knives to separate the hold-down member from the meat at the end of each forward or backward relative movement.

13. In a machine for slitting meat, the combination with a table for supporting the meat to be slit, of a gang of knives, means to produce a relative forward and backward movement between the table and the knives whereby the knives operate to slit the meat on the table, a rocking hold-down member to engage the meat during the operation of the knives thereon, and means associated with the knives to rock the hold-down member and thus separate it from the meat at the end of each forward or backward relative movement.

14. In a machine for slitting meat, the combination with a meat-supporting table, of a gang of knives for cutting slits in a slice of meat supported by said table, a one-piece combined hold-down and stripper member having a convexly-curved surface and a plurality of slots through which the knives operate, means to roll said hold-down member across the meat as the slits are cut therein, and means connecting the hold-down member and the gang of knives and operating to maintain said member in a relative position in which it has a rolling engagement with the portion of the meat being acted on by the knives.

15. In a machine for slitting meat, the combination with a meat-supporting turntable, of a gang of slitting knives, means to move said knives across the table to cut slits in a slice of meat supported thereby, a one-piece combined hold-down and stripper member having a convexly-curved meat-engaging surface and a plurality of slots through which the knives operate, means to roll said hold-down and stripper member across the meat as the slits are cut therein, springs connecting said member to the gang of knives, and means to turn the turntable.

JOSEPH P. SPANG.